United States Patent
Minasi et al.

(10) Patent No.: US 6,175,724 B1
(45) Date of Patent: Jan. 16, 2001

(54) BAND SWITCHABLE INJECTION OSCILLATOR AND COMMUNICATION DEVICE USING SAME

(75) Inventors: David H. Minasi, Plantation; Gustavo D. Leizerovich, Miami Lakes; Peter J. Yeh, Coral Springs, all of FL (US)

(73) Assignee: Motorola, Inc., Schaumburg, IL (US)

( * ) Notice: Under 35 U.S.C. 154(b), the term of this patent shall be extended for 0 days.

(21) Appl. No.: 09/127,924

(22) Filed: Jul. 31, 1998

(51) Int. Cl.[7] .................................................. H04B 1/00
(52) U.S. Cl. ................................ 455/86; 455/76; 455/87
(58) Field of Search ................................. 455/76, 86, 87, 455/147, 196.1, 208, 209, 255, 262, 258, 264, 315

(56) References Cited

U.S. PATENT DOCUMENTS

| | | | |
|---|---|---|---|
| 4,211,975 | * | 7/1980 | Kuroda .................................. 455/259 |
| 5,355,524 | * | 10/1994 | Higgins et al. ......................... 455/86 |
| 5,444,865 | * | 8/1995 | Heck et al. ............................. 455/86 |
| 5,465,409 | * | 11/1995 | Borras et al. ......................... 344/260 |
| 5,519,885 | * | 5/1996 | Vaisanen ................................ 455/76 |
| 5,603,097 | * | 2/1997 | Kanou .................................... 455/76 |
| 5,825,813 | * | 10/1998 | Na ........................................ 375/219 |
| 5,890,051 | * | 5/1999 | Schlang et al. ......................... 455/76 |
| 5,960,334 | * | 9/1999 | Nakano ............................. 455/188.1 |
| 5,966,666 | * | 10/1999 | Yamaguchi et al. .................. 455/552 |
| 5,983,081 | * | 11/1999 | Lehtinen ................................ 455/76 |
| 5,995,844 | * | 11/1999 | Fukudda .............................. 455/462 |
| 6,061,575 | * | 5/2000 | Lombardi ............................. 455/552 |

FOREIGN PATENT DOCUMENTS

| | | | | |
|---|---|---|---|---|
| S62-166619 | * | 7/1987 | (JP) | ................................. H04B/1/16 |
| S62-166625 | * | 7/1987 | (JP) | ................................. H04B/1/26 |
| H10-178316 | * | 6/1998 | (JP) | ................................. H03B/5/02 |
| H10-261958 | * | 9/1998 | (JP) | ................................. H03L/7/10 |
| H11-143568 | * | 5/1999 | (JP) | ................................. G06F/1/04 |

OTHER PUBLICATIONS

Sedra, Microelectronic Circuits, (c) 1987 Holt, Rinehart and Winston, pp 902–908.*
Gray and Meyer, Analysis and Design of Analog Integrated Circuits, (c) 1984 John Wiley&Sons pp. 333, (c) 1987.*

* cited by examiner

Primary Examiner—Reinhard J. Eisenzopf
Assistant Examiner—Makoto Aoki
(74) Attorney, Agent, or Firm—Scott M. Garrett

(57) ABSTRACT

The RF section of a communication device (100) includes a receiver (106), a transmitter (108), first injection frequency generation circuit (120), and an intermediate frequency (IF) generation circuit (124). The IF generation circuit has a shared output coupled to both the receiver and transmitter, as well as a control circuit (118) for feedback control purposes. The IF generation circuit is used to generate IF for both the receiver and transmitter, thus using fewer components that two separate IF generation circuits. It includes two differently tuned voltage controlled oscillators (202, 204) which are selectively and exclusively powered by first and second power switches (234, 236), respectively. The control circuit provides a single control voltage corresponding to a desired frequency pair to both VCOs at a common control input, then selects the appropriate VCO depending on whether the communication device is receiving or transmitting.

4 Claims, 2 Drawing Sheets

BAND SWITCHABLE INJECTION OSCILLATOR AND COMMUNICATION DEVICE USING SAME

TECHNICAL FIELD

This invention relates in general to communication devices, and more particularly to communication devices which transmit on a first frequency and receive on a second frequency.

BACKGROUND OF THE INVENTION

A number of publicly available communication systems use frequency pairing to facilitate communication between transceivers. An excellent example is a cellular communication system which uses one frequency for transmitting and another for receiving. In some communications systems the frequencies are paired, meaning that the frequency difference is constant between transmit and receive frequencies, and different pairs may be used by different equipment within the system. Thus, communication devices for use in such systems must generate one frequency for transmitting signals, and another for receiving signals.

In some systems it is necessary to have two frequency generation circuits, one for transmitting and one for receiving for both carrier and intermediate frequencies. This is because some communication systems providing full duplex service transmit and receive at the same time. In many digital systems, however, due to data and voice compression techniques, it is not necessary for a communication device to transmit and receive at the same time. A popular technique in digital wireless communication systems is to define channels by both frequency and time slots, and is well known as time division multiplexing (TDM), or time division multiple access (TDMA). In wireless TDM systems, such as, for example, digital cellular telephony, a first carrier frequency is used to transmit information from a base station to multiple mobile stations, each assigned to a particular, periodic time slot. Similarly, the mobile stations take turns transmitting information to the base station at different, periodic time slots. Typically the transmit and receive time slots are staggered so that transmitting and receiving do not occur at the same time at the mobile station.

In theory this means in a TDMA system it is not necessary to have two dedicated frequency generation circuits. A single circuit that can switch between receive and transmit frequencies efficiently could be used. This would serve other goals as well. It is well known that in most markets, smaller and lighter communication devices are more desirable by consumers, and having only one circuit would help minimize size and weight. In practice, however, there are significant challenges to overcome to achieve the goal of a single frequency generation circuit for both transmit and receive frequencies. For example, the transient response of the frequency generation circuit in changing from one frequency to another must be sufficient to allow stable switching in the interim between receiving and transmitting. A circuit with acceptable transient response is realizable with conventional technology, but at a cost premium. Additionally, frequency generation circuits have a practical limit as to their frequency range. A typical frequency generation circuit uses a varactor as an adjustable tuning element, and a control voltage is used to select a particular operating frequency. However, the range of the available control voltage may be limited, as in portable battery powered communication devices, and the varactor itself has a practical limit as to the amount of tuning range it can provide. If the transmit and receive frequencies are sufficiently different, a single oscillator circuit might not be able provide sufficient range, and thus two oscillators are often used, particularly for intermediate frequency generation. As it is desirable to reduce cost at the same time as reducing size and weight, such a circuit is not preferred. Therefore there is a need for a frequency generation circuit that has the advantages of reduced size, and fewer parts, and lower operating power compared to two completely separate frequency generation circuits, and avoids the higher costs associated with more sophisticated frequency generation circuits having the ability to switch between transmit and receive frequencies at the desired rate.

DETAILED DESCRIPTION OF A PREFERRED EMBODIMENT

Figure 1:
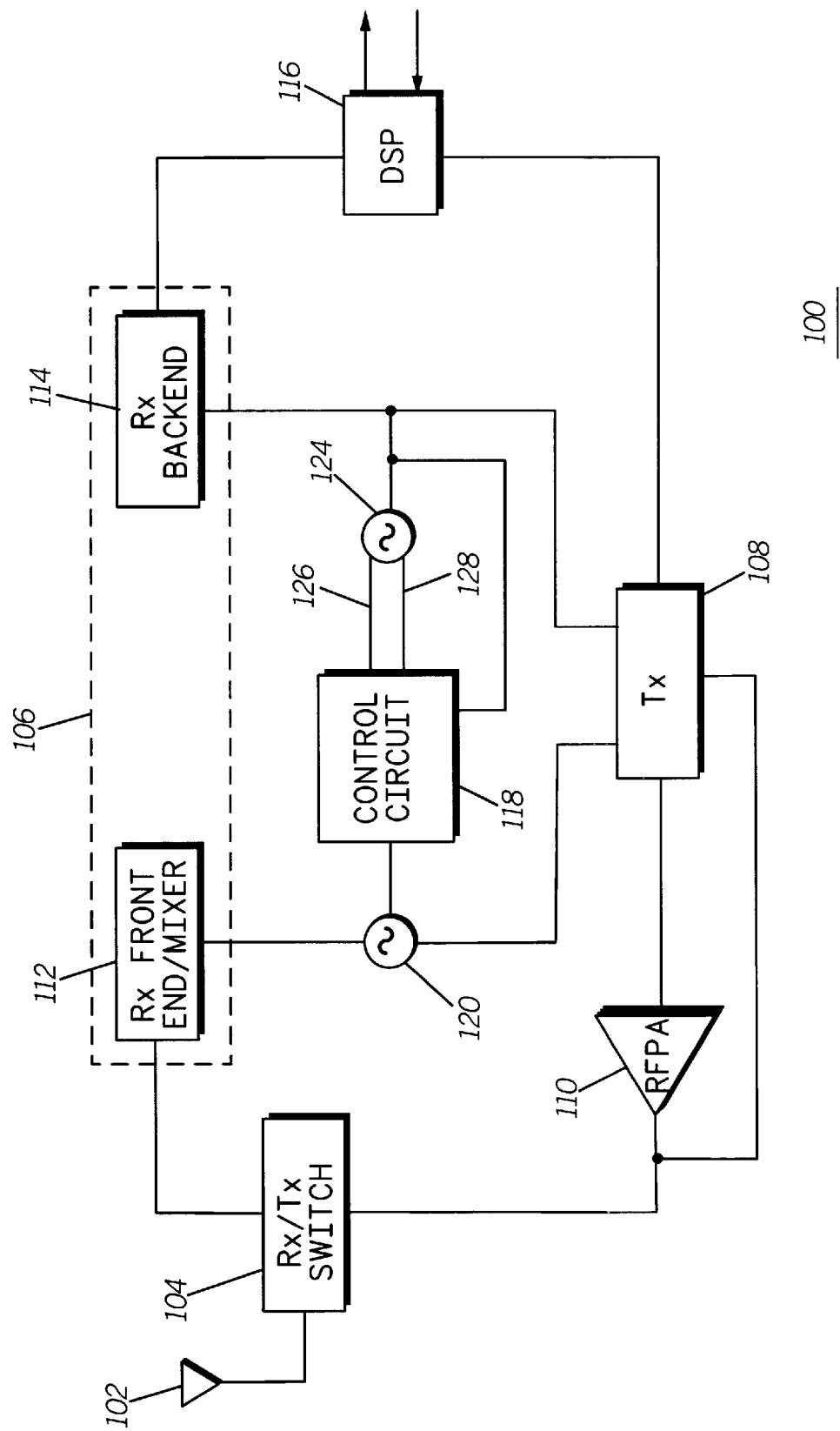
FIG. 1 shows a block diagram of a portion of a wireless communication device in accordance with the invention.

While the specification concludes with claims defining the features of the invention that are regarded as novel, it is believed that the invention will be better understood from a consideration of the following description in conjunction with the drawing figures, in which like reference numerals are carried forward.

The present invention solves the problems associated with the prior art by compromising between two complete and separate frequency generation circuits, and a single complex and costly frequency generation circuit. The present invention provides two frequency selective circuits, each having a different tune under similar direct current (DC) conditions, and which share control elements such as a phase locked loop (PLL) control. Furthermore, the frequency selective circuits are powered mutually exclusive of each other so that they are never both active at the same time. The communication device simply switches between frequency selective circuits depending on what mode it is in, either transmit or receive.

Referring now to FIG. 1, there is shown a block diagram of a portion of a wireless or portable communication device 100 in accordance with the invention, for use in a duplex wireless communication system. In particular, the portion shown relates to the radio frequency (RF) portion of a wireless communication device, and is similar to a superheterodyne transceiver. There is shown an antenna 102 and an antenna switch 104, as are well known in the art. The antenna switch switches a connection to the antenna between a receiver circuit, or simply receiver 106, and a transmitter circuit, or simply, transmitter 108. In the preferred embodiment the receiver is a digital receiver and the transmitter is a digital transmitter, both as known in the art. The receiver receives RF signals from the antenna, and demodulates them to ultimately provide a digital signal. The receiver 106 is shown broken into a receiver front end 112 and a receiver backend 114. The receiver front end demodulates a received signal to provide a signal at an intermediate frequency (IF). The receiver back end further demodulates the IF signal provided by the receiver front end to obtain a baseband signal, then maps the baseband signal onto a constellation pattern to obtain the digital information, as is well known in the art. The digital information is passed to a digital signal processor (DSP) 116. The DSP performs a variety of tasks, including decoding the digital information, and extracting voice data and signal level information. The DSP also receives digitized voice information from other portions of the communication device, and encodes the information and passes the encoded information to the transmitter 108. The transmitter receives a digital signal, and provides a low level RF signal which is amplified by an RF power amplifier 110, as is known in the art.

Frequency generation is controlled by a frequency generation control circuit 118, which will typically include, for example, a reference oscillator, frequency synthesizer, phase locked loop circuit, and so on, all as known in the art. A continuous wave is generated by a first injection oscillator 120 for both the receiver and the transmitter. The transmitter and receiver use different first injection frequencies, but the frequencies are close enough such that a single conventional tunable voltage controlled oscillator is able to generate a wide enough range of frequencies to accommodate both the transmitter and receiver. In operating the communication device, the first injection oscillator will be controlled to generate a continuous wave at which information is received, and will be switched to a second continuous wave frequency at which information is to be transmitted.

A band switchable injection oscillator circuit 124 is used for the second injection oscillator to generate intermediate IF frequencies. However, the IF used in the receiver and transmitter are different enough that a single conventional voltage controlled oscillator would be unable to reliably generate both the receive IF and the transmit IF, the conventional approach is to use to separate IF generation circuits. However, according to the invention, a single control is used in conjunction with a pair of voltage controlled oscillators to produce both IF frequencies, hence a single output is coupled to both the transmitter and the receiver. The control circuit has a pair of control lines 126 and 128 coupled to the second injection oscillator circuit to perform the control and switching necessary to achieve using the single circuit to generate both frequencies. In general, the control circuit 118 sets a control voltage on a first control line 126, then selects one of two frequency selective oscillator sub-circuits by a second control line 128 coupled to a switch select output of the control circuit, depending on which mode the communication device is in, receive or transmit. More detail of this section is given in FIG. 2.

Figure 2:
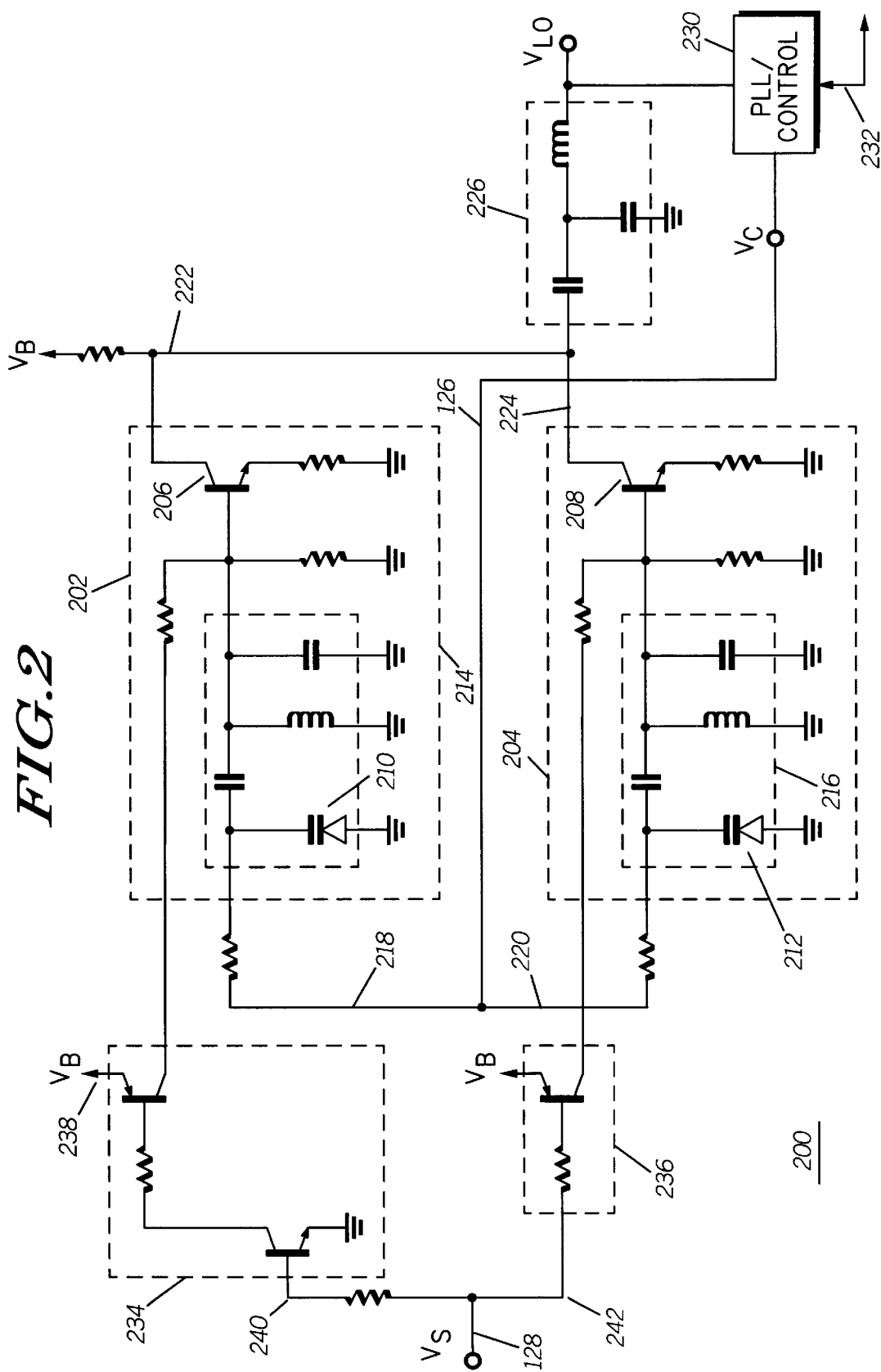
FIG. 2 shows a detailed circuit diagram of a frequency generation circuit for a communication device in accordance with the invention.

Referring now to FIG. 2, there is shown a detailed circuit diagram of a band switchable injection oscillator circuit 200 for a communication device in accordance with the invention. What is shown here includes everything encapsulated in the second local oscillator 124 of FIG. 1, and the essential elements of the control circuit 118. There is included a first voltage controlled oscillator (VCO) 202 and a second VCO 204. Only one of these will be active at any given time, as will be explained in further detail hereinbelow. The first VCO has a first tune and the second VCO has a second tune. The tune refers to the fundamental frequency resulting from the fixed resonant elements of each VCO. Each VCO comprises a transistor 206 and 208, respectively, that act as amplifiers in accordance with oscillator principles as is known in the art. Each VCO also has a tunable component, such as varactors 210 and 212, respectively. In general, the varactors act with the passive resonant elements of each VCO to form a first frequency selective circuit 214 in the first VCO, and a second frequency selective circuit 216 in the second VCO. Each VCO has a control input 218 and 220 which are coupled together to form a common control input. The common control input is coupled to a control output 126 of the control circuit 118. In the particular embodiment shown it will be appreciated by those skilled in the art that the frequency at which the first and second VCOs oscillate will in part be determined by the voltage level applied to the common control input. In practice a DC voltage level will be applied once a channel pair is assigned for the communication device to use, and may be adjusted slightly during operation. Each VCO has an output 222 and 224, respectively, which are coupled together and filtered through an output filter 226 to provide an oscillator output 228. The oscillator output is sampled by the control circuit 118, and in particular a PLL 230. The PLL receives control signals 232 from other portions of the control circuit, indicating what frequencies to set the VCOs at, and provides the DC voltage at the common control input in accordance with that indication. It will be understood that DC simply means substantially constant during a given time period. In practice, of course, the level will change to generate different frequency pairs when the communication device is assigned to different frequency pairs.

Since the two VCO circuits have a common output, they cannot be allowed to oscillate at the same time. To preclude simultaneous operation of the VCOs, power is selectively applied to either one, corresponding to the mode of the communication device. So, for example, in receive mode, power is applied only to the first VCO, and when in a transmit mode, power is applied only to the second VCO. This is accomplished by the use of a first power switch 234 and a second power switch 236. The first power switch is coupled between a power source 238, shown here as VB, and the first VCO. In the embodiment shown, the first power switch controls the application of bias to the base of the transistor 206. Likewise, the second power switch 236 does the same for the second VCO. Both the first and second power switches have inputs, 240 and 242, respectively, that are coupled together to form a common select input, which is coupled to control line 128 of FIG. 1. It is preferable that a select signal applied to the common select input by the control circuit 118 is a logic signal, a 1 or a 0, as known in the art. Each power switch has a switch state, and the switch state can be either open or closed, as is known in the art. In general, the first power switch closes when the select signal is at a first level, and is open otherwise, and the second power switch closes when the select signal is at a second level, and is open otherwise. Thus, there is never a time when both power switches are closed. In other words, the power switches having complementary switch states for the same given switch select signal level. Complementary states can be accomplished by designing the power switches substantially as shown, where the first power switch is PNP transistor driven by an NPN transistor coupled to the common control input, and the second power switch is simply a PNP transistor coupled directly to the common control input.

When the first power switch closes, power is applied to the first VCO, which generates a frequency, controlled by the PLL and control circuit, for use by the receiver. Likewise, when the second power switch closes, power is applied to the second VCO, which generates a frequency, controlled by the PLL and control circuit, for use by the transmitter. It is preferable that the respective tune setting of the first and second VCOs are such that the control voltage does not substantially change when switch from the first to the second VCO, or vice-versa.

In practicing the invention, it is preferable to be used in a communication system where transmit and receive frequencies are paired, and have a preselected frequency difference so that each pair of frequencies are the same frequency difference apart. Furthermore, the communication system is such that the communication device receives in a first periodic time slot and transmits at a second periodic time slot, as in conventional TDM and TDMA systems. By periodic it is meant that the time slot is recurring at the same time in a period, such as a frame. This allows a designer to select tuning components for the first and second VCOs so that at an appropriate control voltage level applied to the common control input, the first VCO will generate a desired receiver frequency when selected, and the second VCO will generate a corresponding transmitter frequency without substantially changing the control voltage level. A preferred method of practicing the invention includes determining the control necessary for the frequency pair to which the communication device intends to communicate over, applying the control voltage to the common control input. When the communication device is in a receive mode, selecting the first VCO by providing a first select signal level at the common select input of the power switches, and providing a second select signal level when the communication device is in a transmit mode.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A portable communication device, comprising:
    a receiver circuit having a receiver front end circuit and a receiver back end circuit;
    a transmitter circuit;
    a second injection oscillator circuit comprising:
        a first voltage controlled oscillator (VCO) having a first tune;
        a second VCO having a second tune;
        the first and second VCOs each coupled to a common control input;
        a first power switch coupled between a power source and the first VCO for controlling power to the first VCO, and having a switch state;
        a second power switch coupled between the power source and the second VCO for controlling power to the second VCO, the second power switch being configured to have a complementary switch state of the first power switch;
        the first and second power switches having a common select input;
        the first and second VCOs having a common output coupled to both the receive back end circuit and the transmitter circuit; and
    a control circuit having a control output connected to the common control input of the second local oscillator circuit, a switch select output connected to the common select input of the second local oscillator circuit, the control circuit providing a control voltage level at the common control input corresponding to a desired frequency, and providing a select signal at a first level to the common select input when the portable communication device is in a receive mode and providing a select signal at a second level to the common select input when the portable communication device is in a transmit mode.

2. A portable communication device as defined in claim 1, wherein the control circuit comprises a phase lock loop circuit for controlling the control voltage level.

3. A portable communication device as defined in claim 1, wherein the first power switch comprises a PNP transistor driven by an NPN transistor.

4. A portable communication device as defined by claim 1, wherein the second power switch is a PNP transistor.

* * * * *